US006474413B1

(12) United States Patent
Barbosa et al.

(10) Patent No.: US 6,474,413 B1
(45) Date of Patent: Nov. 5, 2002

(54) PROCESS FOR THE REDUCTION OF THE RELATIVE PERMEABILITY TO WATER IN OIL-BEARING FORMATIONS

(75) Inventors: Luiz Cesar Ferreira Barbosa, Rio de Janeiro (BR); Sérgio Luiz Pereira De Freitas Coelho, Niterói (BR); Carlos Roberto Carvalho De Holleben, Rio de Janeiro (BR); Geraldo Maria Ramos De Godoy, Rio de Janeiro (BR)

(73) Assignee: Petroleo Brasileiro S.A. Petrobras, Rio de Janeiro (BR)

( * ) Notice: Subject to any disclaimer, the term of this patent is extended or adjusted under 35 U.S.C. 154(b) by 147 days.

(21) Appl. No.: 09/666,542

(22) Filed: Sep. 21, 2000

(30) Foreign Application Priority Data

Sep. 22, 1999 (BR) .............................................. 9904294

(51) Int. Cl.[7] .............................................. E21B 33/13
(52) U.S. Cl. ........................ 166/270; 166/295; 166/400
(58) Field of Search ................................ 166/270, 275, 166/400, 263, 279, 294, 295

(56) References Cited

U.S. PATENT DOCUMENTS

| 3,949,811 A | 4/1976 | Threlkeld et al. |
| 3,981,363 A | 9/1976 | Gall |
| 4,488,601 A | 12/1984 | Hammett |
| 4,498,539 A | 2/1985 | Bruning ...................... 166/294 |
| 4,552,217 A | * 11/1985 | Wu et al. .................... 166/270 |
| 4,664,713 A | * 5/1987 | Almond et al. ............. 523/130 |
| 5,079,278 A | 1/1992 | Mitchell ..................... 523/130 |
| 5,379,841 A | 1/1995 | Pusch et al. ................ 166/295 |
| 5,789,351 A | 8/1998 | Ahmed et al. .............. 507/203 |

FOREIGN PATENT DOCUMENTS

| EP | 0 197 684 | 10/1986 | ........... E21B/43/25 |

\* cited by examiner

*Primary Examiner*—David Bagnell
*Assistant Examiner*—Zakiya Walker
(74) *Attorney, Agent, or Firm*—Sughrue Mion, PLLC

(57) ABSTRACT

A process for the selective and controlled reduction of permeability to water in oil-bearing formations made up of sandstone or limestone, the process comprising the injection of a slug of polymer aqueous solutions having a polarity opposite to the polarity of the rock, followed by the injection of a spacing slug of alkaline halide and then a fresh slug of polymer aqueous solution, the polarity of which is opposite to the polarity of the first polymer slug, and then a slug of aqueous solution of trivalent metal crosslinking agent to effect the partial crosslinking of the polymer charges, the polymer layers being successively added until the injection pressure of the polymer aqueous solutions show that the desired Residual Resistance Factor RRF was attained, and well production may be resumed.

22 Claims, 9 Drawing Sheets

PROCESS FOR THE REDUCTION OF THE RELATIVE PERMEABILITY TO WATER IN OIL-BEARING FORMATIONS

FIELD OF THE INVENTION

The present invention relates to a process for the selective and controlled reduction of the relative permeability to water in oil-bearing formations, and more specifically to such a process whereby said reduction is achieved with the aid of successive polymer slugs, which are adsorbed to the rock surface and among themselves, creating a hydrophilic film which swells in the presence of water and strongly reduces the permeability to water. On the contrary, in the presence of oil the film keeps its original thickness, so that the permeability to oil is only slightly reduced.

BACKGROUND INFORMATION

The production of water associated to the production of oil has been one of the major drawbacks for oil companies worldwide. The breakthrough of the formation or injection water results in a strong decline of oil production, increasing the operation costs for pumping, treatment and discarding of huge volumes of water.

Different techniques may be used to reduce the production of water or to prevent its anticipated breakthrough, the choice of the best technique being a function of the origin of the produced water. Therefore, the analysis of the well and the reservoir should precisely determine the origin of such water.

Water coning or channeling of injected water frequently causes high water/oil ratios so that the use of flow barriers is successful. Such barriers may have a plugging effect or they may reduce permeability, that is, the systems may be respectively blocking or selective.

The plugging barriers, which block simultaneously the flow of gas, oil and water, may be formed by cements, resins, solid particle suspensions, silicates, wax, or water soluble polymers crosslinked in situ in the reservoir.

On the contrary, selective systems block mainly the flow of water, while the flow of hydrocarbons is only slightly restricted. These selective barriers are generally formed by water-soluble copolymers, which adsorb to the surface of the rock, forming a hydrophilic film, which reduces water mobility.

The preparation of selective polymer systems is a function of the mineralogy and permeability of the rock, reservoir temperature and salinity of the formation water. The kind of rock, sandstone or limestone, defines the ionic character of the polymer to be used as the first slug to contact the formation, since such first slug promotes a better adsorption of the next plug of polymer. Thus, the adsorption sites mainly negatively charged on the surface of sandstones require cationic polymers. Inversely, limestones are favored by the anionic character of polymers to enhance the adsorption ability and thus the formation of the hydrophilic film in charge of the selective reduction of water permeability.

High formation temperatures may inhibit the effect of applied treatments. Under these circumstances, the polymer tolerance may be improved by adding products such as AMPS (2-acrylamido-2-methyl propanosulfonic acid) and/or vinyl pyrrolidone to the molecular structure of the base polymer.

On its turn, salinity may inhibit the swelling of the hydrophilic film and thus hinder the effect of permeability reduction to water.

As regards the rock permeability, the higher this parameter, the thicker should be the hydrophilic film. This may be obtained through the increase in the molecular weight of the polymer (monolayer configuration), or through the piling of cationic and anionic polymers and crosslinking agents (multilayer configuration).

Further main advantages of the selective systems are:

The treatment is injected through the annulus or through the string, dispensing with the need to modify the equipment normally in the production of the well; perforation or completion rigs are dispensed with.

On the contrary, plugging treatments may require the isolation of the zone to be treated. Rigs are then required and the operation cost is considerably increased.

U.S. Pat. No. 4,409,110 teaches a process for the secondary or tertiary recovery of oil using a mixture of non-ionic and polycationic polymers. The mixture leads to a reduction in viscosity in a first pumping phase while after the injection of the mixture, the adsorption of the cationic polymer on the rock causes an increase in viscosity, so as to improve the sweep efficiency. At the same time, the observed adsorption causes the inhibition of the swelling of the clays. On the other hand, under certain circumstances of pH and temperature the non-ionic polymer undergoes hydrolysis, and becomes anionic. By contacting the cationic polymer, the anionic polymer forms a solid precipitated which would also be adequate for use in producing wells as plugging agent.

U.S. Pat. No. 4,498,539 teaches a process for the correction of permeability to water and a composition for the process, to improve the efficacy of the water injection. Such process involves the sequential injection of i) one optional aqueous slug in order to adjust the salinity of the formation water; ii) an aqueous thickened slug; iii) an aqueous entrainment fluid. The aqueous thickened slug is made up of a polyvalent metal cation, such as aluminum citrate, a gellable polymeric viscosifier such as polyacrylamide, and a hydrolizable ester suitable for the pH adjustment which is effective for the delayed reduction of the pH of the polymer slug, so as to provide the ideal condition for in situ gellification.

U.S. Pat. No. 5,079,278 teaches a gel-forming polymer aqueous composition, which is able to selectively plug high permeability zones in subterranean oil-bearing formations. The composition comprises an aqueous solution of a high molecular anionic terpolymer of acrylamide, which contains of between 5 to 95 weight % 2-acrylamido-2-methyl propane sulfonic acid, of between 2 and 95 weight % N-vinyl-N-methyl acetamide and of between 5 to 93 weight % acrylamide, and a crosslinking agent selected among the group comprising transition metal ions, phenolic resins and amino resins. The described composition forms stable gels in brines of a wide range of salinity, the gels being effective at the pH levels encountered in carbon dioxide and water injection.

U.S. Pat. No. 5,379,841 teaches the reduction or the elimination of the permeability to water by injecting a copolymer, which contains anionic and cationic portions in its structure. It is alleged that by varying the amount of types of comonomers present in the copolymer it is possible to achieve improved adsorption of the polymers to various kind of rocks, from sandstones to limestones. In spite of the alleged advantage, that the polymers may be used in various kinds of rocks, the synthesis of polymers having complex structures, which should be tested for each particular situation, is certainly time-consuming and expensive. Besides, said US patent uses high molecular weight polymers in one single layer, this being only effective for high salinity, and low to medium permeability reservoirs. In case of high permeability, the efficacy of the process using a high molecular weight polymer as a monolayer may be critically impaired.

On the contrary, the present invention may be extremely flexible by only using ready commercial products, this rendering the present process cheap and versatile, since the need of the particular formation is met by varying the number of successive polymer layers. The flexibility of the applications according to the present invention is also consequent to the various molecular weights and hydrolysis degrees of the commercial products used, which may be dimensioned as a function of the reservoir conditions (kind of rock, temperature, salinity and permeability).

European EP 0197684 teaches reducing the permeability of sandstones by injecting an aqueous solution of a water-soluble anionic polymer having a molecular weight higher than 100,000, followed by the contact of said polymer with a stabilizing fluid which comprises a water-soluble cationic polymer having molecular weight higher than 1,000. In spite of the alleged results, it should be noted that sandstones are rocks having mostly negatively charged rocks, and that the contact of said negative charges of the rock with a polymer itself negative (anionic) does not yield the desired adsorption level, so that the obtained film is of reduced thickness. In spite of the addition of the stabilizing cationic polymer, the results obtained for Residual Resistance Factor are poor (see Table III page 28 of the specification of EP 0197684) except for experiment 3, which shows good results. Said European patent does not make reference to the use of successive layers of anionic polymer and cationic stabilizer.

U.S. Pat. No. 5,789,351 teaches a process for altering the permeability of subterranean formations through the use of a gelling composition, which contains a carboxylate-containing polymer and a trivalent crosslinking agent related to zirconium. No gelling delayer is used, the delay being obtained by preparing the polymer solution in a brine where the amount of dissolved salts serve as a gelling retarder.

Thus, the patent literature teaches various procedures where i) the polymers used are weakly adsorbed by the rock and present low molecular weight, with the ensuing low values of Residual Resistance Factor (RRF), that is, the plugging of the water production zone is below the desired value, or ii) complex syntheses and expensive products are involved, with the use of the monolayer configuration. However, many times said products reveal themselves useless in formations of high salinity and high permeability.

The same way, most known processes which use a trivalent crosslinking agent somehow requires that the crosslinking reaction be delayed so that the reaction may occur in the reservoir and not in the production string.

Thus, the literature does not describe nor suggest a process for the selective and controlled reduction of the permeability to water of water producing areas in sandstones, such as described and claimed in the present application. Therefore the process of the Applicant comprises therefore the injection in a producing well, of an aqueous solution of cationic polymer where the polymer composition shows high adsorption to the sandstone rock of the reservoir, followed by an aqueous solution of anionic polymer, and optionally of a slug of cationic crosslinking agent to effect a punctual crosslinking so as to form layers but without forming gel. All the polymer slugs are separated by the injection of spacing aqueous solutions which prevent the formation of gel, and allowing the contact of polymers of different ionic nature only in the making up of the hydrophilic film. Then, further anionic, crosslinking and spacing slugs are injected, until the Residual Strength Index is attained. Such process is described and claimed in the present invention.

In case of a limestone rock, rich in positive charges, the order of addition of the polymer compositions of the invention is inverted. Thus, the injection into the production well is started by a polymer composition containing an anionic polymer, which may or may not be followed by slugs of cationic polymer or trivalent crosslinking agent, which works as a cationic layer former.

No matter the kind of reservoir rock, it is preferable that the last layer be made up of a cationic polymer or of the crosslinking agent, which works as a stabilizer.

SUMMARY OF THE INVENTION

The process for the selective and controlled reduction of the permeability to water in formations penetrated by at least one production well for the production of oil and/or gas bearing sandstone rocks according to the present invention comprises in a general way the alternated injection, into a production well, of slugs of aqueous cationic polymer solutions, followed by the injection of slugs of aqueous anionic polymer solutions and optionally slugs of trivalent cationic crosslinking agent, optionally followed by the injection of further slugs of anionic polymer solution and slug of trivalent crosslinking agent, forming layers until the desired Residual Resistance Factor is attained. The slugs of polymer solution and crosslinking agent are always separated by slugs of an aqueous solution of an alkaline salt such as NaCl or KCl.

When the formation is rich in limestone rocks, at first a slug of an anionic polymer solution is injected, followed by successive slugs of cationic polymer solution or of multivalent crosslinking agent and anionic polymer, the last layer being always made up of a crosslinking agent, so as to confer to the hydrophilic film a cationic character. All the polymer solution slugs are alternated with spacing slugs of an aqueous solution of an alkaline salt such as KCl.

In order to avoid the mixture of solutions of different polarity within the well, the slugs of aqueous cationic and anionic polymeric solutions as well as the slug of aqueous solution of the multivalent cationic crosslinking agent are separated by slugs of aqueous solutions of alkaline salts such as KCl. This serves to prevent the mixture of the said cationic and anionic polymer aqueous solutions (as well as the mixture of said solutions with the crosslinking agent) which would cause flocculation, precipitation or gel formation in the string, this bringing harm to the injection of the aqueous solutions themselves into the reservoir.

The dimensioning of the spacing slug is effected so as to prevent the occurrence of flocculation, precipitation or gel formation near the face of the well, this bringing harm to the injection, besides reducing the possible extension of the treatment.

Therefore, the spacing slug between the several slugs of aqueous polymeric solutions addresses a main need, that is, to allow that the several slugs be adsorbed to the polymer films which have been previously formed, without forming gel or precipitates, and this, at the desired treatment extension. By using spacing slugs, the procedure of the invention makes possible to dispense with the use of crosslinking retarders employed in state-of-the-art technique, such as for example aluminum citrate.

The concept of the present invention involves therefore injecting into a production well as many layers of polymer as required to attain the desired Residual Resistance Factor. That is why it is possible to state that the present process involves the selective and controlled reduction of the permeability to water, since the layers of polymer and crosslinking agent are injected into the production well according to the condition of permeability, salinity and temperature.

Thus, according to the conditions of the formation, the same polymer solution may be injected in several layers, or different polymers will be injected, forming layers, which will yield the desired effect.

In the field, the injection of the several slugs of polymer solutions is controlled by the pressure and flow rate of injection of the slugs, this being an indication of the attained reduction in permeability.

Therefore, contrary to the teachings of the patent literature, the present invention makes use of a concept which leads to the selective and controlled reduction of the permeability to water not by the plugging of the formation pores with insoluble gels but instead by the accumulation of adsorbed polymer layers, the kind of polymer to be injected as well as the number of layers being a function of the permeability, temperature and salinity of the producing formation.

Still, contrary to the gels described in the patent literature, where full crosslinking eliminates all residual charges from the formed gel, the punctual or partial crosslinking promoted by the crosslinking agent applied according to the invention leaves residual positive charges on the surface of the last layer of anionic polymer (or crosslinking agent), said charges serving for attraction as well as anchoring to the next anionic layer to be injected in the well.

According to one preferred mode of the invention, for sandstone rocks having medium to high permeability and medium to high salinity, the slug of polymer solution to be injected in the production well may be made up of a layer of cationic polymer followed by a layer of anionic polymer and crosslinking agent, followed or not by further layers of anionic polymer and crosslinking agent, so as to form various layers.

For producing formations having low permeability and low salinity the process may be much simpler: one single layer of cationic polymer may be injected in the production well, or one layer of cationic polymer followed by a layer of anionic polymer, followed or not by other layers of cationic and anionic polymer.

According to another preferred mode of the invention, as applied to formations rich in limestone rocks having medium to high salinity and medium to high permeability the slug of polymer may be made up of one layer of anionic polymer followed by successive layers of multivalent crosslinking agent and anionic polymer.

For more favorable situations, that is, low permeability and/or low salinity, one single layer of anionic polymer is sufficient.

The several process options and the corresponding compositions are chosen as a function of the salinity of the formation water as well as the permeability of the rock and temperature.

Broadly, for a production well, the process of the present invention for the selective reduction of the permeability to water comprises:

by injecting into said production well a slug of water or of cleansing organic solvent the volume of which should be close to that of the annulus or of the production string, withdrawing any damage caused to the formation by precipitation of waxes or asphaltenes;

injecting alternate slugs of aqueous cationic or anionic polymer solution, so as to form layers, each layer of anionic polymer being optionally linked to another layer of anionic polymer through a slug of cationic crosslinking agent, each slug of injected polymer aqueous solution being separated by a slug of aqueous solution, all aqueous solutions, either polymeric or not, being added of an amount of alkaline salt sufficient to prevent the swelling of the reservoir clays, and so successively, until desired polymer layers are obtained which are efficient to increase the Residual Resistance Factor RRF, the control of pressure as well as injection flow rate of the various slugs of aqueous polymer solutions so as to indicate if the desired increase in RRF has been attained;

by injecting a further water slug, displacing, after the addition of the polymer slugs, the last polymer slug the farthest possible from the face of the well;

in order to create oil saturation before the well, injecting a low volume-slug of organic solvent (either an aliphatic solvent or the formation oil itself);

shutting the well for 24 hours to cause the polymer to adsorb to the rock; and resuming well production.

Thus the present invention provides a process for the selective reduction of the relative permeability to water in formations having wide range of salinity and permeability, said process being based on the injection, into a production well, of a slug of an aqueous solution of a cationic (or anionic) polymer, forming a layer, to which are adsorbed successive layers of anionic polymer (or cationic and anionic polymer) and crosslinking agent. This is the so-called SELEPOL process.

The present invention provides still a process for the selective reduction of the relative permeability to water where the polymer layers are spaced by slugs of aqueous solutions to which an alkaline salt has been added, such slugs serving to: i) displace the slugs of polymer solutions away from the face of the well; and ii) separate the various polymer slugs, so as to avoid the straight contact between polymers of opposite polarities which would tend to flocculate and form gels having the ability to block the formation, such gels blocking the passage of any reservoir fluids, water, oil and gas.

The present invention provides further a process for the selective reduction of the relative permeability to water where the slugs of aqueous solution between the polymer slugs cause that the reactions between polymer slugs only occur between the polymers embedded within the formed polymer film and the polymers of the following slug, so that the film formation occurs in layers having a point-to-point instead of a tridimensional crosslinking, that is, there are no gels nor precipitates.

The present invention provides still a process for the selective reduction of the relative permeability to water where the absence of polymer gel makes that the permeability to oil remains practically unaltered relative to the situation where no polymer slugs are added.

The present invention provides still an extremely flexible process for reducing the relative permeability to water by using solely commercial products, this rendering such process cheap and versatile, since the need of each formation is supplied by the variation of the successive layers of a certain type of polymer. Still, the flexibility of the applications according to the present invention is caused by the varied molecular weights and hydrolysis degree of the commercial products used in the process, which will be dimensioned as a function of the reservoir conditions (kind of rock, temperature, salinity and permeability).

DETAILED DESCRIPTION OF THE PREFERRED MODES

Figure 1:
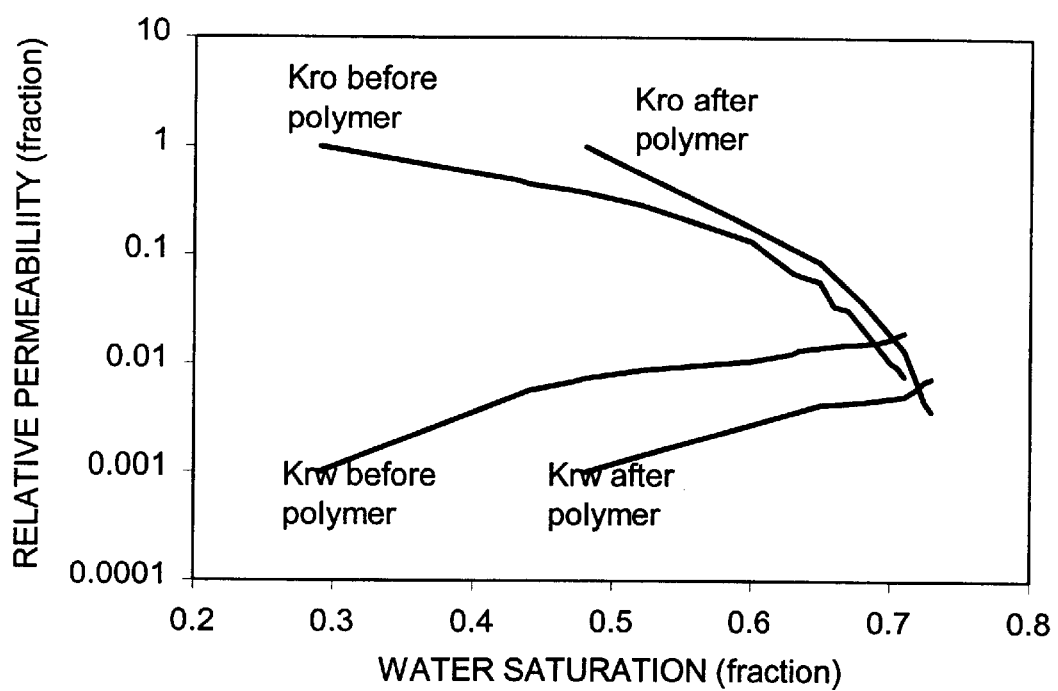
FIG. 1 depicts curves of relative permeability to oil (Kro) and water (Krw), before and after treatment with the polymer compositions used in the process of the invention.
Figure 2:
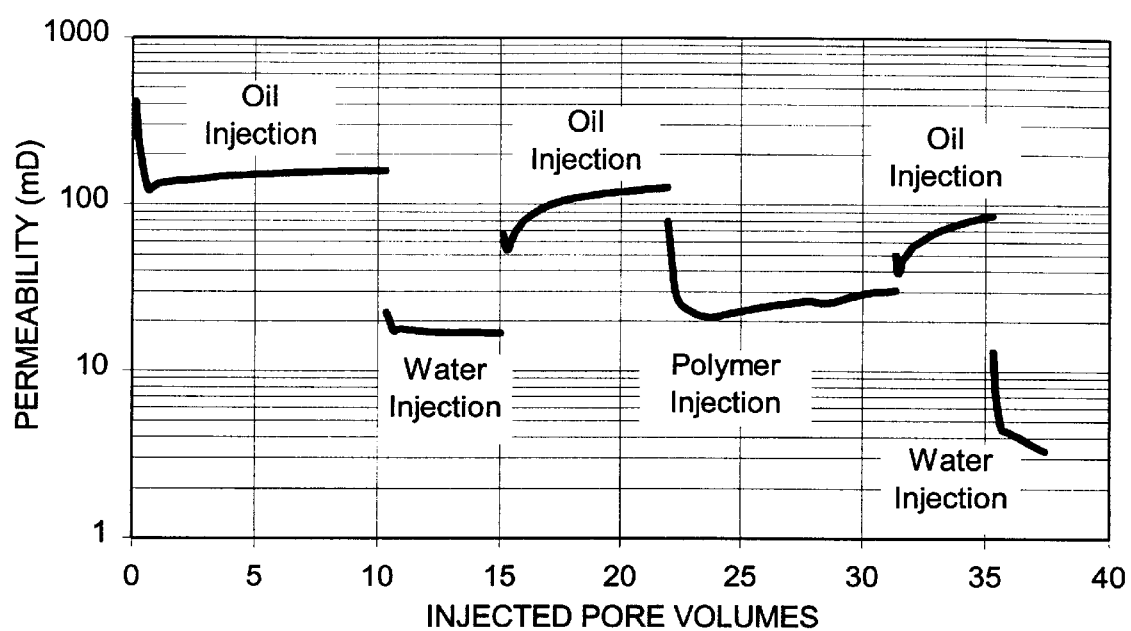
FIG. 2 is a graph of the permeability vs. IPV (injected porous volume), several draining curves (oil) and imbibition (water) showing that after the inventive treatment with polymer, the draining curve recovers values close to the initial values, while the values for the imbibition curve are dramatically reduced.

Broadly, the concept of the present invention comprises the injection of aqueous polymer slugs alternated with the injection of spacing slugs of aqueous solutions, said slugs allowing the displacement and separation between the polymer slugs, so that the layer is only formed on the polymer film. This way it is possible to prevent the mixture between the polymer solutions and crosslinking agent, said mixture being a source of undesired tridimensional crosslinking with loss of selectivity and blocking of the formation pores.

In the present specification and claims, the term "partial crosslinking without gel formation" or simply "punctual crosslinking" means that the crosslinking agent that bears at least three positive charges when interacting with the already adsorbed anionic polymer may react with two charges of the same polymer chain (intramolecular reaction) or alternatively with one charge of one chain and another charge of another chain (intermolecular reaction), leaving one positive charge remaining for anchoring one charge of the following layer of anionic polymer. This way, contrary to state-of-the-art processes, in the invention there is no gel formation by complete crosslinking.

The crosslinking agent is thus necessarily a multivalent compound, at least trivalent, since for example divalent compounds, as explained hereinbefore, would not possess remaining positive charges that could serve as anchoring spots for forming another layer.

Further, the term "polymer" may mean homopolymer, copolymer or terpolymer.

In the present specification and claims, the term low permeability represents values for the permeability of the formation between 100 and 300 mD, while medium permeability represents values for formation permeability between 301 and 600 mD and high permeability represents values for the formation permeability between 601 and 2000 mD.

The formation temperatures to which the present process may be applied are between 45 and 110° C., more preferably between 55 and 95° C.

The inventive process produces a selective reduction in the permeability to water of the producing formation through the injection into a producing well of an aqueous solution of a polymer according to the invention since the reduction in the relative permeability to water is larger than the reduction in the permeability to oil.

The inventive process causes a controlled reduction in the relative permeability to water of the producing formation through the injection into a producing well of an aqueous polymer solution according to the invention, the successive application of layers of cationic (or anionic) polymer, alkaline chloride spacing slug and crosslinking agent, the anionic (or cationic) polymer layers and crosslinking agent being repeated, the latest layer always having a positive charge, until the pressure of the injection of the polymer aqueous solution shows that the Residual Resistance Factor (RRF) to water has been attained.

Thus, the reduction in the relative permeability is controlled by means of the injection of the required amount of polymer, as layers, without affecting the face of the well and without causing precipitation/undesired gel formation.

The slug of aqueous polymer solution to be injected in the reservoir according to the SELEPOL process of the invention, as applied to formations rich in sandstone rocks comprises the injection of a slug of cationic polymer, followed by a spacing slug of brine, of a slug of anionic polymer, of another spacing slug of brine and of other alternated or successive slugs of cationic polymer, the kind of polymer used as well as the number of polymer layers being a function of the rock permeability as well as of the salinity of the water and the formation temperature.

For reservoirs of high salinity and temperatures in excess of 70° C. it is preferable to use, after the injection of the first slug of anionic polymer solution, a slug of multivalent crosslinking agent to replace the successive slugs of cationic polymer solutions. Under such hostile conditions, the crosslinking agent provides better strength to the polymer film.

Under another aspect of the invention, in order to reduce the viscosity of the polymer solution and prevent the swelling of the formation clays, the slug of cationic or anionic polymer aqueous solution always contain a certain amount of alkaline salt.

For a formation rich in limestone rocks, the SELEPOL process comprises the injection of an anionic polymer, followed by successive layers of cationic polymer or of trivalent crosslinking agent, always alternating with slugs of anionic polymer, according to the same criteria of kind of polymer and number of layers already discussed for the sandstone-rich rocks.

It is then easy to understand that the slugs of solutions of positive charge-containing compounds, either a cationic polymer or a multivalent metal crosslinking agent, are directed to effect a partial crosslinking with the negative charges of the anionic polymers.

A cationic polymer suitable for preparing the aqueous solution is a polyacrylamide copolymerized with dimethyl amino acrylate (ADAM).

An anionic polymer suitable for preparing the aqueous solution is a copolymer of acrylamide and acrylic acid.

The amount of polymer used in the composition to be injected varies within wide limits.

For cationic polymers, the usual amounts are between 500 and 4000, preferably between 1,000 and 3,500, and more preferably between 2,500 and 3,000 ppm by weight of polymer, based on the total amount of aqueous solution.

For anionic polymers, the amounts used vary between 500 and 3000, preferably 1000 to 2500, and more preferably between 1500 and 2000 ppm by weight of polymer, based on the total of the aqueous solution.

Amounts of polymer lower than 500 ppm in the slugs of aqueous solutions are possible, however, the volumes to be injected become exceedingly high, this being a drawback for the operation efficacy.

Amounts of polymer in excess of 4,000 or 3,000 ppm may not be suitable, depending on the kind of polymer, since the viscosities may become too high, this impairing the injection of the aqueous polymer solutions.

The amounts of polymer, by weight, in the slugs of polymer aqueous solutions as well as the volumes to be injected are determined from the adsorption tests to the rock and will be a function of the radial distance to be penetrated by the slug of polymer aqueous solution within the reservoir.

The volumes of aqueous solutions contain the required amounts of polymer to attain the required penetration. Such penetration is attained using the required concentration of polymer to form the required adsorption however in a volume of solutions inferior to that, which should be used if the slug ought to travel all the desired radial distance. The spacing slugs and the successive polymer solutions displace the more concentrated solutions to the desired penetration.

By using said mode of injection, layers are formed having different thickness, since the first layer penetrates more in the reservoir, the second one, a bit less, and so on. The last layer, which is closest to the face of the well, shows the larger thickness. The general shape of the layers in the interior of the formation is that of a wedge. The advantage of said format is that the face of the well, which is more worn out due to the production itself, is better protected by the layers of larger thickness.

Figure 7:
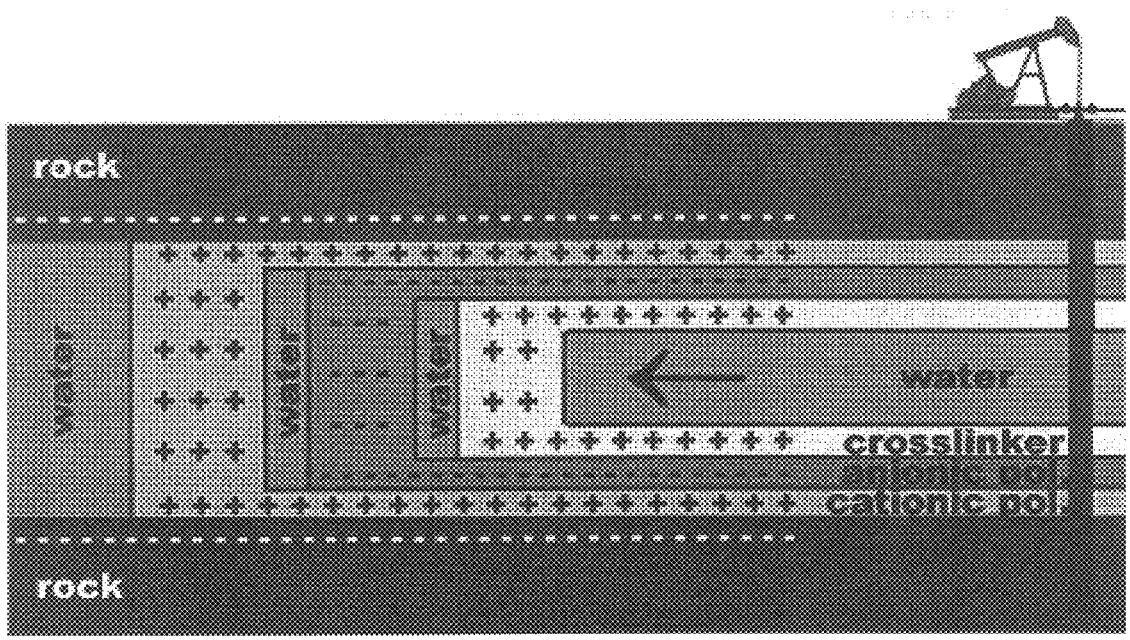
FIG. 7 is a schematic illustration of the concept of the invention, for sandstone rocks, with injection of successive plugs of aqueous and polymeric solutions and a crosslinking agent, so as to form polymer layers free of three-dimensional gel.
Figure 8:
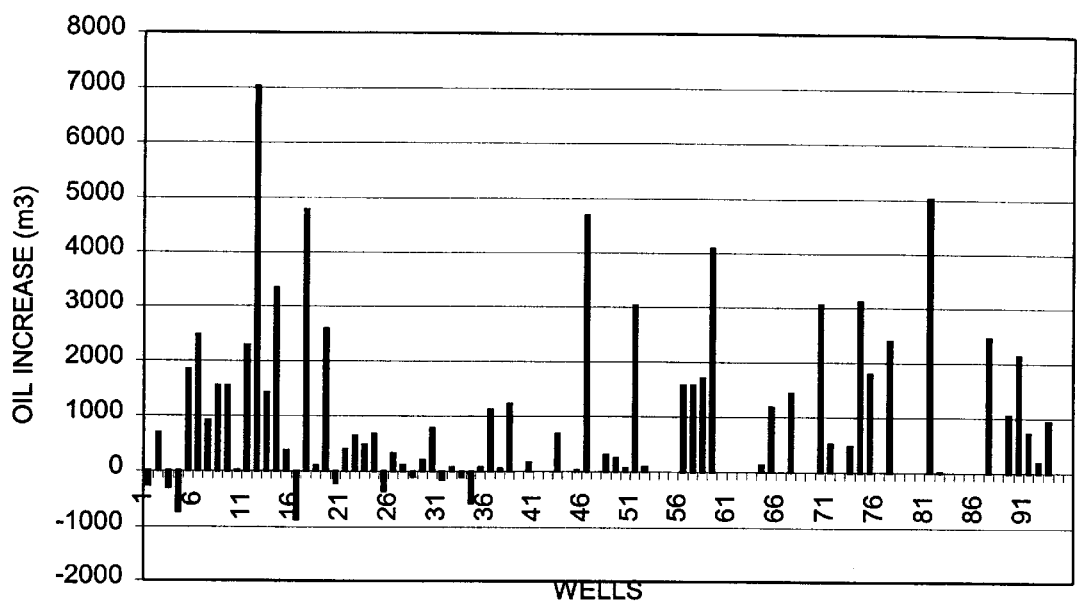
FIG. 8 is a graph, which illustrates the field yields in terms of oil increase, for several wells treated according to the process of the invention.
Figure 9:
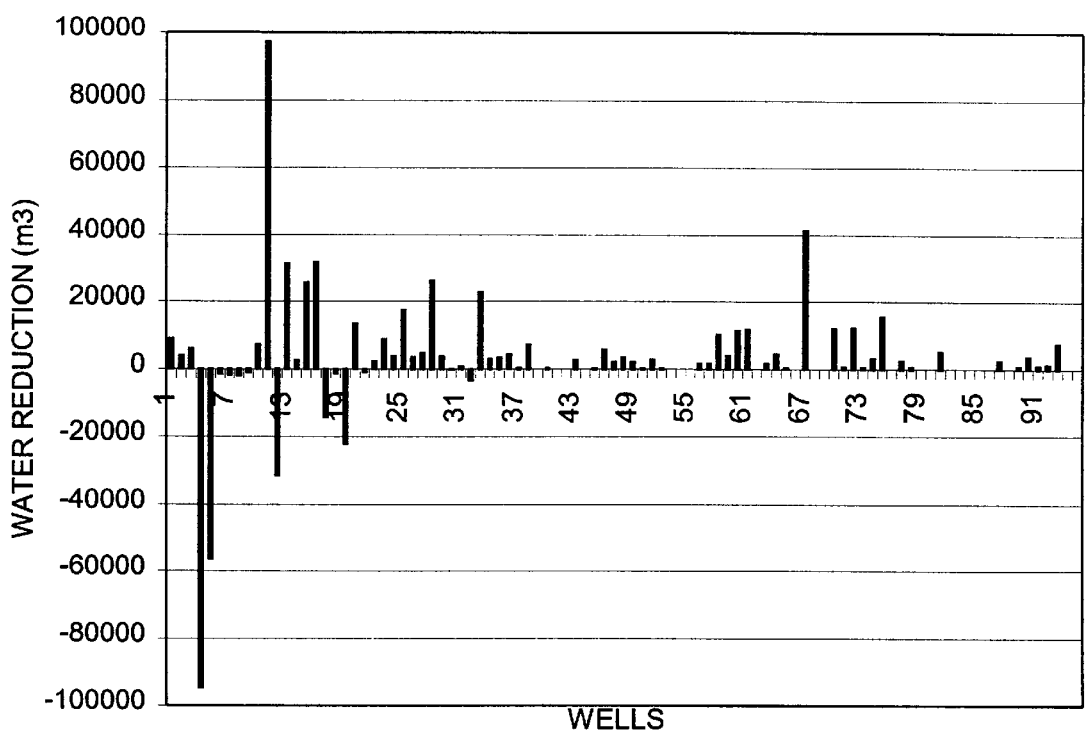
FIG. 9 is a graph, which illustrates the reduction of water for various wells, obtained as a result from the treatment according to the process of the invention.

Such inventive concept, as illustrated in attached FIG. 7 for a sandstone rock, is a main distinctive feature of the present invention relative to state-of-the-art technique, since none of the known processes describe nor suggest that the slugs of polymer aqueous solutions be injected so as to provide adsorption to the reservoir rock and form polymer layers in a format that protects the face of the well and provides a low-cost process based on lower injected volumes and reduced operating time.

The molecular weight of the polymers useful for the practice of the present invention may vary within wide limits, and generally comprises molecular weights in the range of 50,000 to $20 \times 10^6$ dalton.

The lower molecular weight polymers is between 50,000 and $3 \times 10^6$ dalton, preferably between 200,000 and $1 \times 10^6$ dalton.

The higher molecular weight polymers have molecular weights in the range of more than $3 \times 10^6$ dalton until $20 \times 10^6$ dalton.

The alkaline salt for compounding the brine designed to reduce the viscosity of the polymer aqueous solution and improve the injectivity may be any low-cost, widely available alkaline salt such as an alkali metal chloride, such as sodium chloride or potassium chloride, KCl being preferred since it prevents the swelling of the clays. The amount of alkaline chloride used varies between 100 and 30,000, preferably 10,000 and 22,000 and more preferably between 15,000 and 20,000 ppm in the aqueous solution.

The water used for preparing the polymer aqueous solution to be injected in the reservoir should be free of salts.

The crosslinking agent, whenever used, is a cation of a multivalent, at least a trivalent metal such as $Fe^{3+}$, $Al^{3+}$, $Ti^{4+}$, $Sn^{4+}$, $Zr^{4+}$ and $Cr^3$, able to form tridimensional bonds with the charges of the anionic polymer. A preferred agent is a commercial aluminum halide, Poly-Aluminum Chloride (PAC), of formula $Al_2(OH)_n\ Cl_{(6-n)})_m$ where "m" is the polymerization degree, normally m<10 and 1<n<5. In aqueous solution PAC is easily hydrolyzed, yielding long molecular chain polyhydroxides. Aluminum polyhydroxychlorosulfates may also be used. It is obvious that aluminum chloride itself may be used, however its use causes a few drawbacks on manipulation, hence already hydrated products are preferred.

The amount of crosslinking agent may vary of from 20 to 500, preferably 30–300, and still more preferably, of from 50 to 200 ppm weight based on the total volume of solution to be injected into the formation.

The polymer solutions are prepared through the addition of the polymer to water at ambient temperature, under stirring, until the polymer is fully dissolved. Then KCl or any other alkaline salt is added up to a concentration of 18,000 to 22,000 ppm by weight, for example, 20,000 ppm by weight aiming at reducing the viscosity of the solution and thus making easier the injection of the polymer solution into the formation.

Preferably, the polymer solutions according to the invention are introduced into the reservoir through a production well.

In spite of the fact that the process of the invention is easily applicable to reservoir conditions that may be considered as mild, that is, low or medium salinity and low temperatures, it is specially directed to high salinity formations, up to 150,000 ppm in dissolved salts, and temperatures up to 110° C.

The injection of each polymer slug is preceded by the injection of a brine slug such as KCl used as clay conditioner and for determining the suitable pressure and flow rate for injecting the polymer. In order to displace the polymer slug towards the interior of the formation, after each slug of polymer a fresh brine slug is injected.

All the aqueous solutions employed in the process according to the invention, that is, the polymer slug, spacing slug and crosslinking agent slug contain further an alkaline chloride in an amount of from 100 to 30,000 ppm, preferably 10,000 to 220,000, and more preferably 15,000 to 20,000 ppm by weight of alkaline chloride, based on the total volume of the aqueous solution.

According to one preferred mode of the invention, as applied to sandstone formations of medium salinity and permeability, the injection of an aqueous solution of a cationic polymer slug into a production well is followed by the injection of successive layers of anionic and cationic polymer, forming a film that is adsorbed to the rock, each polymer layer being spaced from the following layer by a spacing slug of aqueous solution of KCl brine.

And according to another preferred mode of the invention, as applied to sandstone formations of high salinity and permeability, the injection of an aqueous solution of a cationic polymer slug in a production well is followed by the injection of successive layers of anionic polymer and crosslinking agent. Each polymer layer, be it cationic, anionic or crosslinking agent, is spaced from the following layer by small slugs of KCl brine. The brine slugs serve not only to space the several polymer layers and crosslinking agent but also to clean the vessels where the solutions are prepared.

In formations where the reservoir water shows medium salinity (<30,000 ppm of TDS—Total Dissolved Solids) and any permeability, the reduction of the relative permeability to water may be reached by injecting, in a production well, slugs of cationic polymer followed by a slug of aqueous solution of spacing agent alkaline chloride, layers of anionic polymer and a fresh slug of aqueous solution of spacing agent alkaline chloride, and successively, so that alternate layers of polymer of opposite charges are formed, eventually reducing the relative permeability to water. However, such process configuration, which does not include any crosslinking agent, is more sensitive to the temperature and salinity of the formation. Thus, from 35,000 ppm TDS in the formation water, it may happen that the previously generated layers are dissolved, the application of the process under such salinity conditions being rather limited.

In case the formation is rich in limestone rocks, the first polymer slug will be a cationic polymer aqueous solution, followed by successive layers of trivalent crosslinking agent and anionic polymer according to the permeability and salinity of the formation water.

In all cases, the process for the reduction of the relative permeability to water of the water producing interval, in the reservoir area close to any well, comprises introducing in the area to be treated one or more polymer aqueous solutions, injected from said well. Subsequently, the well is put again under producing conditions for the extraction of oil and/or gaseous hydrocarbon.

After the treatment, the permeability to oil and/or gaseous hydrocarbon in the treated area is hardly affected, while the permeability to water is highly reduced.

The aqueous solutions comprise one or more polymers that show the following structures:

Preferred commercial cationic polymers are related to dimethyl amino ethyl acrylate (ADAM) (Structure I) and to dimethyl amino ethyl methacrylate (MADAM) (Structure II):

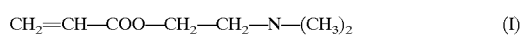
(I)

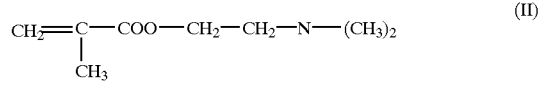
(II)

The quaternization of (I) with dimethyl sulfate yields structure (III) or ADQUAT:

(III)

The quaternization of (II) with the same dimethyl sulfate yields structure (IV) or MADQUAT:

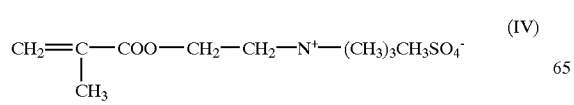
(IV)

While the quaternization of the same structure (I) by chloromethylation yields structure ADCL (V):

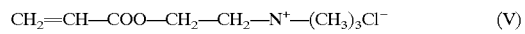
(V)

And the quaternization of structure (II) by chloromethylation yields structure MADCL (VI):

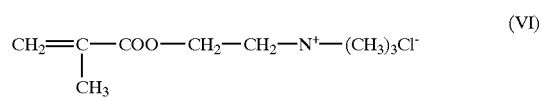
(VI)

A copolymer of acrylamide AM and ADQUAT yields structure (VII)

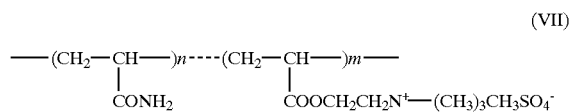
(VII)

A copolymer of acrylamide AM and ADCL yields structure (VIII):

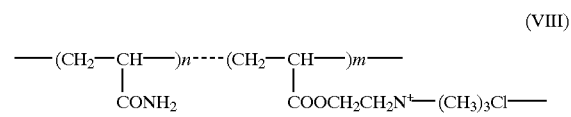
(VIII)

A copolymer of acrylamide AM and MADQUAT yields structure (IX):

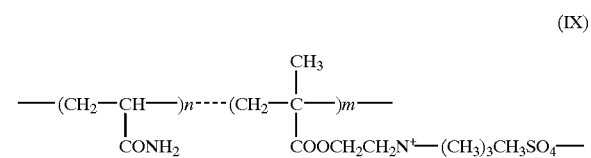
(IX)

A copolymer of acrylamide AM and MADCL yields structure (X):

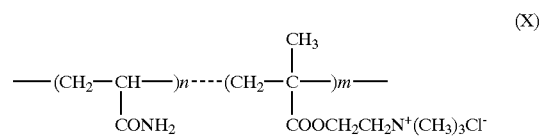
(X)

Other useful products are reaction products of dimethyl amine (DMA) and epichlorhydrine, according to structure (XI) below, of a polyamine:

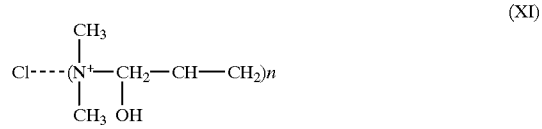
(XI)

Another useful product is the reaction product of methyl amine e epichorhydrin, yielding structure (XII) below:

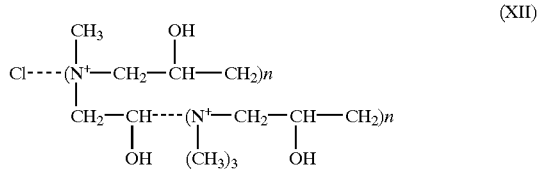

A further useful structure is structure (XIII) below, APTAC:

[CH$_2$CH—CO—NH—CH$_2$—CH$_2$—CH$_2$—N$^+$]—(CH$_3$)$_3$Cl—(XIII)

The basic structure in the formation of anionic copolymers for use in the invention at temperatures around 70° C. is a partially hydrolyzed acrylamide.

Another useful structure as a basis for anionic copolymers or terpolymers to be used in applications where the temperature is in excess of 70° C. and the salinity is high, is structure XIV below, that is, 2-acrylamido-2-methyl propanesulfonic acid monomer (AMPS):

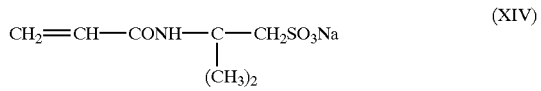

A terpolymer related to AMPS, acrylamide and acrylic acid is also useful under hostile conditions (high temperature, high salinity) is depicted by structure XV below:

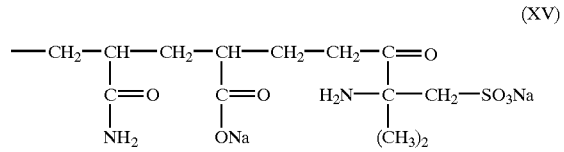

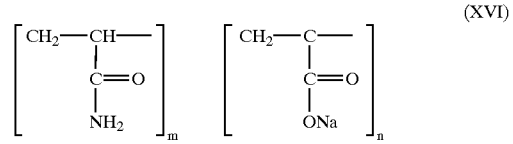

wherein m+n=100 and m is between 1 and 99 while n is between 1 and 100.

The choice of the kind of polymer structure depends on the reservoir conditions. Thus, for a reservoir under higher temperature and salinity conditions, more resistant cationic polymers are preferred, such as structures XI, XII and XIII. The most preferred anionic polymer under said circumstances is an acrylamide-AMPS-acrylic acid terpolymer, structure XV.

For the purposes of the present invention, cationic degree of a polymer is, for example, in a structure such as VII and VIII, the amount of units related to ADQUAT or ADCL relative to the acrylamide units of the copolymer. Thus, a copolymer having a cationic degree of 30 means that 70 moles % of the copolymer are acrylamide moieties and 30 moles % are ADQUAT or ADCL moieties.

The anionic copolymers are derived from acrylamide and acrylic acid, where the hydrolysis degree 30 means that 70 moles % of the copolymer are acrylamide moieties while 30 moles % are acrylic acid moieties.

The suitability of the polymer compositions of the present invention to the process for selectively reducing the water producing zones is determined with the aid of laboratory and field tests for various water salinity conditions and various temperatures.

The general conditions for applying the SELEPOL process to sandstone or limestone reservoirs having average permeability of up to 3,000 mD, temperatures up to 110° C., containing formation waters of salinity up to 150,000 ppm TDS are listed in TABLE 1 below:

TABLE 1

| Treatment | Salinity (ppm) | Temperature (° C.) | Permeability (md) |
|---|---|---|---|
| Control | <3,000 | 60 | <1,000 |
| Selepol 1 | <20,000 | <60 | >1,000 |
| Selepol 2* | <150,000 | <110 | 1,000–3,000 |

*SELEPOL and crosslinking agent

Control represents a slug of aqueous polymer solution according to the state-of-the-art technique.

SELEPOL 1 for sandstones comprises injecting a slug of aqueous cationic polymer solution, followed by the successive injection of slugs of aqueous anionic and cationic polymer solution, the last two slugs being repeated as much as desired, forming the required layers until the values for pressure and flow rate indicate that the desired RRF (Residual Resistance Factor) has been attained. All the slugs of polymer aqueous solutions are spaced by the injection of spacing slugs of brine solution.

And SELEPOL 1 for limestone rocks starts by the injection of a slug of aqueous anionic polymer solution followed by the successive injection of slugs of aqueous cationic and anionic polymer solutions.

SELEPOL 2 directed to sandstones starts by the injection of a slug of cationic polymer aqueous solution, followed by the successive injection of slugs of anionic polymer aqueous solution and crosslinking agent solution, the latest two slugs being repeated as much as wanted, forming the required layers until the values of pressure and flow rate indicate that the desired RRF has been attained.

SELEPOL 2 directed to limestone rocks starts by the injection of a slug of anionic polymer aqueous solution, followed by the successive injection of slugs of multivalent crosslinking agent and of the injection of a slug of anionic polymer aqueous solution, the latest two slugs being repeated so many times as required.

The process to be used will be SELEPOL 1 or 2 according to the temperature and salinity conditions of the reservoir.

The cationic and anionic polymers are selected according to the temperature and permeability of the reservoir. Low permeability reservoirs require low molecular weight polymers while those of higher permeability require polymers of higher molecular weight.

Higher temperature reservoirs require polymers that resist such high temperatures.

For a reservoir of temperature up to 70° C., a cationic polymer suitable for preparing the aqueous solutions for injecting according to the present invention is a copolymer of acrylamide and ADQUAT (structure III) of cationic degree between 10 and 50%, preferably between 15 and 30%, more preferably 20% and molecular weight (MW) between 1,000,000 an 15,000,000 dalton, preferably between 8 and 10,000,000 dalton.

A further structure useful for reservoirs having temperatures up to 70° C. is structure V.

For reservoirs having temperatures higher than 70° C., a cationic polymer suitable for preparing the aqueous solutions of the invention is a copolymer of acrylamide and MADQUAT (structure IV), of a cationic degree as in case of the reservoirs having temperatures up to 70° C.

For reservoirs having temperature higher than 70° C. the terpolymer of acrylamide, acrylic acid and AMPS is the ideal compound (structure XV).

For the purposes of the invention, useful concentrations of cationic polymer or copolymer are between 500 and 4,000 ppm, preferably between 1,000 and 3,500 and still more preferably between 2,500 and 3,000 ppm of cationic polymer or copolymer in the aqueous solutions.

And, useful concentrations of anionic polymer or copolymer are between 500 and 3,000 ppm, preferably 1,000 and 2,500 ppm, and still more preferably, 1500 and 2,000 ppm of anionic polymer or copolymer in the aqueous solutions. Below, lab and field tests are described, those tests evidencing the reducion in the water producing zones by applying the polymer solutions of the invention.

Laboratory Tests

The laboratory tests aim at determining the polymer adsorption to the rock and therefore the amount of polymer to be injected into the formation so that it is possible to obtain the desired Residual Flow Resistance.

Single-phase Flow Tests

In the laboratory, the single-phase flow tests for determining the polymer adsorption and the Residual Resistance Factor (RRF) comprised the injection of the formation water in a porous medium for measuring the initial absolute permeability, followed by the injection of the polymer solutions, and finally the re-injection of the brine for assessing the effect of the polymer film on the absolute permeability to water. The adsorption, which represents the weight of polymer irreversibly adsorbed to the rock surface, was determined through the balance of polymer mass injected and produced, the concentration of polymers in the effluent samples being monitored by means of UV spectrophotometry. The Residual Resistance Factor to water RRFw is defined as the ratio between the permeabilities to water before and after the application of the treatment.

The adsorption tests determine that one portion of the polymer is instantaneously adsorbed to the formation rock, while another portion remains suspended in the aqueous solution. That is why it is part of the inventive concept of the present process the introduction of a brine slug immediately after the injection of each polymer slug. The brine slug aims at entraining that amount of polymer still suspended in the aqueous solution up to the radial distance in the formation where it is desired to reduce the relative permeability to water. This way it is possible to convey the polymer until the desired radial distance in the formation, the brine slug serving as the polymer conveyor, displacing the polymer at a certain distance from the well, as required to reduce the relative permeability to water.

The porous medium used in the laboratory tests is preferably a Berea or Rio Bonito sandstone. Tests are equally effected in reservoir cores. In order to reproduce similar conditions, it is advisable that the permeability of the test porous medium be close to that of the reservoir.

TABLE 2 below lists the results of adsorption tests for two Controls and SELEPOL 1. In this latter case, high adsorption of the anionic polymer, which adsorbs to the cationic polymer layer, results in a thicker film than it would be if one single cationic polymer layer was employed (Control 1).

TABLE 2

| Kind of Treatment | Total Adsorption of the Polymer ($\mu g/g$ rock) | | RRFw |
|---|---|---|---|
| | Oationic | Anionic | |
| Control | — | 25 | 3.0 |
| Control 1 | 89 | — | 4.5 |
| SELEPOL 1 | 78 | 264 | 14 | where RRFw=Residual Resistance Factor to water

The data of TABLE 2 above demonstrate that for just the anionic polymer, the adsorption to the sandstone formation is rather low. The adsorption is improved if the initial injected polymer is cationic (Control 1). And the use of layers of cationic and anionic polymer according to the invention (SELEPOL 1) shows a high adsorption, this being conveyed to the values of RRFw.

Two-phase Flow Tests

The two-phase flux tests were performed in order to determine the effect of the hydrophilic film on the relative permeabilities to water and to oil and the corresponding values of Residual Resistance Factor (RRFw and RRFo). The test sequence comprised the saturation of the cores with brine, alternate cycles of draining and imbibition, treatment injection, and further cycles of draining and imbibition. The end permeabilities of each of these cycles was then calculated.

TABLE 3 below shows tests 1, 2 and 3 for a Control polymer, under a temperature of 60° C. and water salinity of 1,000 ppm TDS, where Residual Resistance Factor (RRF) values to water between 3 and 7 were observed, the variation being a function of the absolute permeability of the porous medium used.

TABLE 3

| Test | Kg | RRFw | RRFo |
|---|---|---|---|
| 1 | 560 | 3.6 | 1.2 |
| 2 | 775 | 7.4 | 2.0 |
| 3 | 147 | 4.9 | 1.2 |

Where Kg=absolute permeability to gas (mD)

The observation of the contents of TABLE 3 leads to the conclusion that for the Control the Residual Resistance Factor (RRFw) to water (3.6, 7.4 and 4.9) is neatly superior to the Residual Resistance Factor (RRFo)o to oil that is only 1.2, 2 or 1.2. This demonstrates that under mild conditions the polymer is selective to reduce the permeability to water, while the permeability to oil is slightly affected.

Tests were run under more hostile conditions, that is, temperature between 70 and 90° C. and salinity 100,000 ppm NaCl using the polymer solutions of the SELEPOL 1 and 2 processes. The results are listed in TABLE 4 below.

TABLE 4

| Test | Treatment | Temperature (° C.) | Kar (mD) | RRFw |
|---|---|---|---|---|
| 21 | SELEPOL 1 | 70 | 1020 | 54 |
| 25 | SELEPOL 1 | 70 | 863 | 13.3 |
| 22 | SELEPOL 1 | 90 | 1389 | 3.5 |
| 23B | SELEPOL 1 | 90 | 1437 | 3.9 |
| 13 | SELEPOL2 | 90 | 5830 | 5.3 |
| 14 | SELEPOL2 | 90 | 2054 | 11.1 |

Data from TABLE 4 lead to the conclusion that the SELEPOL 1 polymer solution has resisted well to temperatures up to 70° C. and salinities up to 100,000 ppm, yielding RRFw values of the same order than those obtained from TABLE 3. It should be noticed further that the tests of TABLE 4 used cores having absolute permeabilities well ahead those of the tests of TABLE 3, this demonstrating the high efficacy of the process even under hostile conditions. Under a temperature of 90° C., the SELEPOL 1 treatment yielded RRFw values of the same order immediately after being applied. However, the value obtained was quickly reduced, the permeability returning to its original value after a while.

On the contrary, under the same conditions of temperature (90° C.) and salinity (100,000 ppm), the SELEPOL 2 process of the invention yielded RRFw values of the same order and kept the values for a long time. It should also be understood that the high RRFw values were obtained in porous media of extremely high permeability.

Therefore, the Control and SELEPOL 1 process show that it is possible to reduce the relative permeability to water with one single polymer layer or with several layers, for low formation salinity or low temperatures. However, the application of said procedures is not applicable to situations where high temperatures may be encountered, as is often the case.

The obtained results led the Applicant to conduct new tests in order to determine the effects of the polymer treatment on the curves of relative permeability. The two pairs of curves, before and after the treatment, calculated according to the method of E. F. Johnson et al.: "Calculation of relative permeability from displacement experiments", Trans, AIME (1959), vol. 126, p. 37–372, are shown in FIG. 1. The result was a significant displacement of the curve of permeability to water towards the right in the water saturation scale (permeabilities to water much lower for the same water saturation), and nearly no effect in the curve of permeability to oil. The large difference in the residual water saturation, before and after the treatment, is due to the presence of clays in the rock, whose high ability to absorb the polymer leads to the retention of large volumes of water.

Field Tests

Control and SELEPOL 1 and 2 processes were applied to 96 treatments (see TABLE 5), in 77 wells of different fields and zones, the features of which as regards permeability, temperature and salinity are presented in TABLE 6.

During the selection of wells and treatment evaluation, the well production curves were intensively used, such as Np (accumulated oil production) vs. (Np+Wp), Wp (accumulated water production), vs. (Np+Wp), WOR (Water/Oil Ratio) vs. time, Qo (volumetric flow rate of oil in m3) and Qw (accumulated flow rate of water) vs. time.

The complete analysis of these data, as well as other relevant information, indicate the origin of high water productions: water cone, water channeling, natural or induced failure, holes in the casing and bad cementing. The selective processes for the control of the water production are only applicable to cones and channeling.

The selection of the most suitable process to each field, Control, SELEPOL 1 or 2, was based on the reservoir permo-porous features, as well as on the oil viscosity, temperature and salinity of the reservoir water.

The field operations were shown to be simple ones, the injection of the treating polymer solutions being made through the production string or the annulus, for the cases where there are higher intervals of wells having double completion. The injection also depends on the elevation system installed in the well. Generally, there is no need to re-complete the wells in order to suit them to the treatments.

All the wells were carefully monitored during one month before the treatments, with at least two measurements of total flow rate and water cut every week. After the treatments, monitoring was maintained until water cut stabilization and then spaced to one measurement a month.

Field Treatments—Control

The Control process was applied to 43 treatments of different oil fields of the North-East area of Brazil, whose overall features may be found in TABLE 5 below.

The treatments comprised the sequential injection of brine (20 kg/m3 of KCl), polymer solution (1 kg/m3 polymer+20 kg/m3 KCl), and finally a fresh brine slug. The first brine slug (pre-flush) was designed to the conditioning of the clays and to determine the suitable pressure and flow rates for the polymer injection. The second brine slug was designed to displace the polymer slug into the formation interior.

Figure 3:
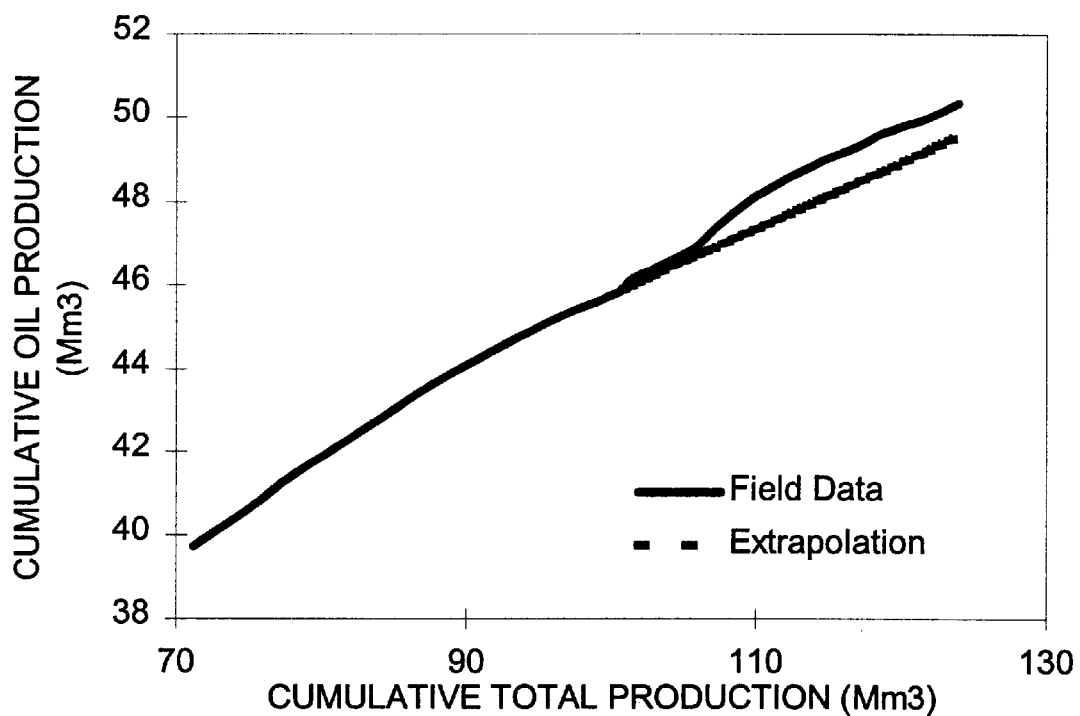
FIG. 3 is a curve of the cumulative oil production vs. the total cumulative oil production of well A, where T1 represents the first treatment according to the invention.
Figure 4:
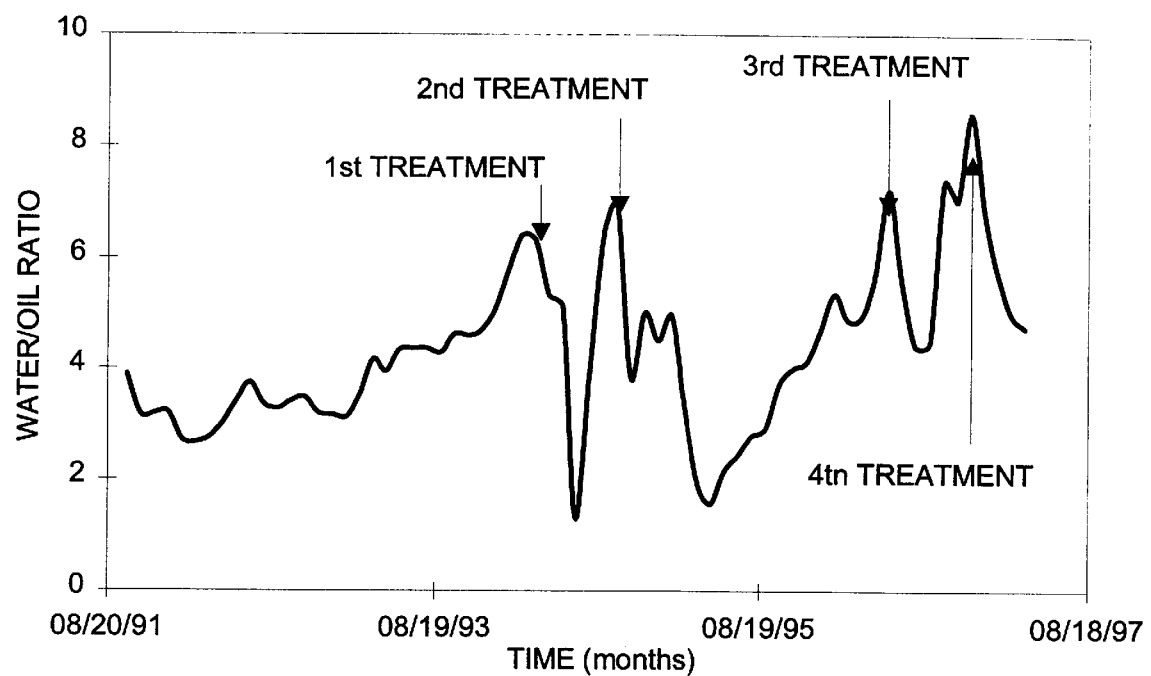
FIG. 4 represents the water/oil ratio vs. time for well A, where T 1 to T4 represent field tests.
Figure 5:
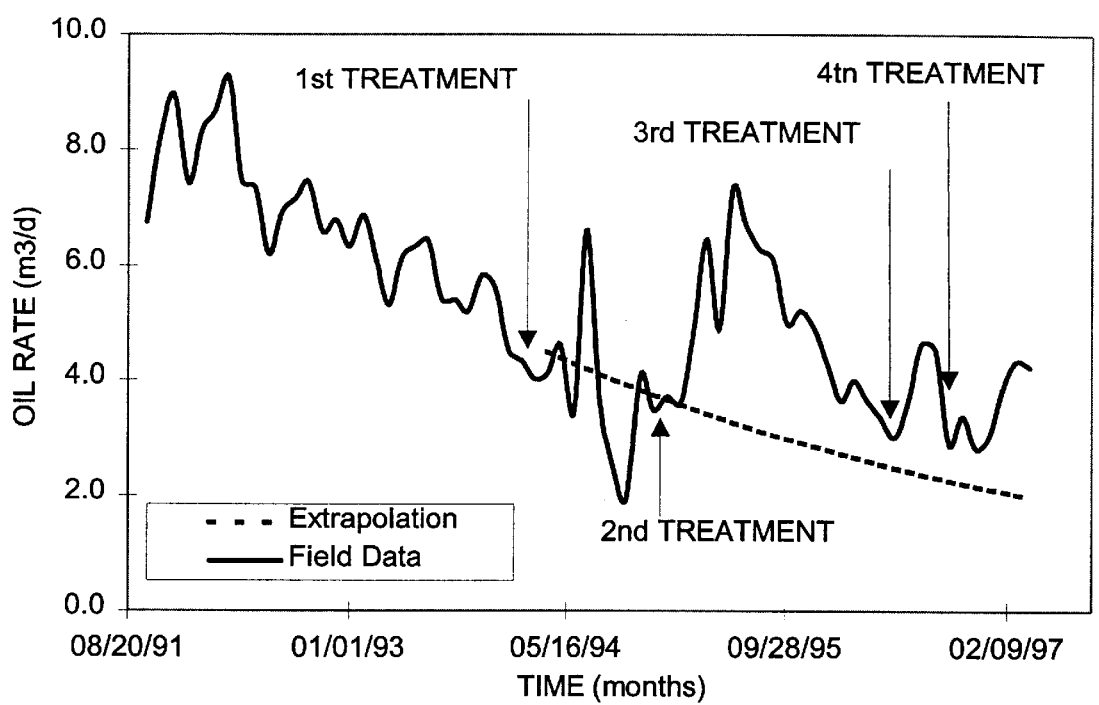
FIG. 5 represents the water vs. time rate for well A, where T 1 to T4 represent field tests.
Figure 6:
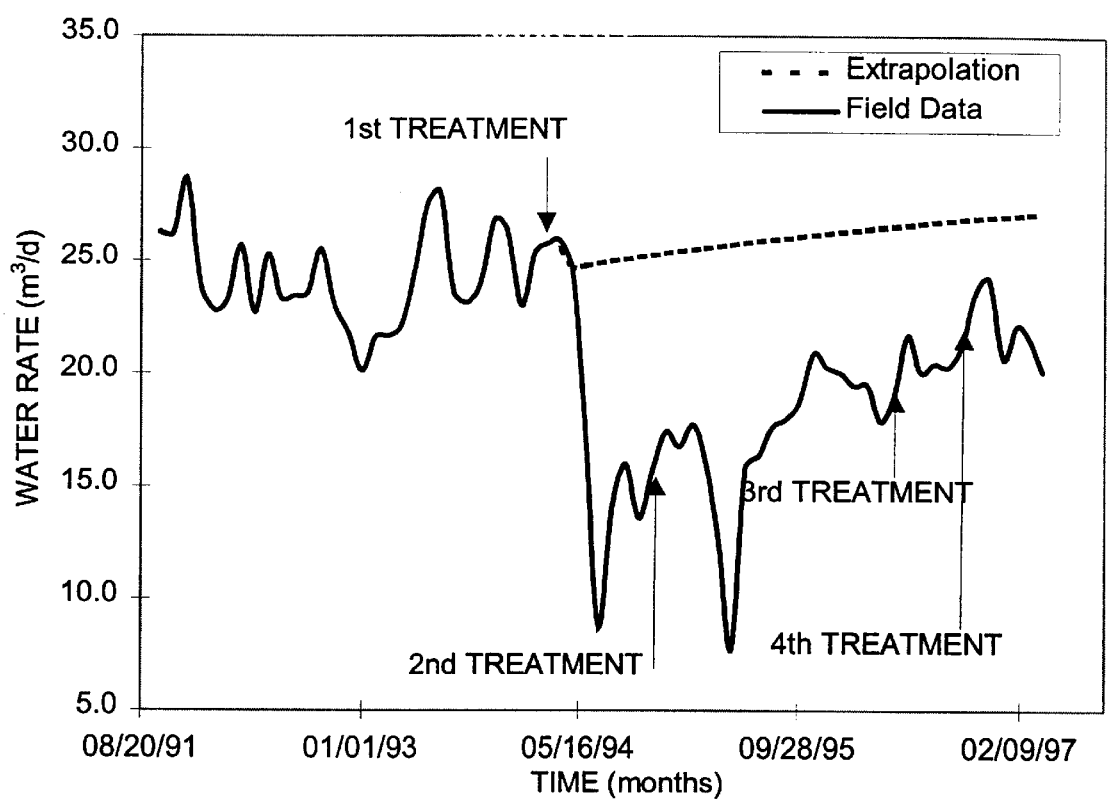
FIG. 6 represents the oil vs. time rate for well A, where T 1 to T4 represent field tests.

FIGS. 3 to 6 show the results of the operations carried out in well 35, as an example of the evaluation of treatments. After the first 180 barrel treatment, the curve Np vs. (Np+Wp) of FIG. 3 shows an increase in oil production. FIG. 4 shows the corresponding decline in the water cut. FIGS. 5 and 6 show the increase in oil production and the decline in the flow rate of water production, respectively.

Such results, however, due to the small polymer slug, were of short duration.

The treatment was then repeated with a 840 barrel slug, the same FIGURES showing still better results, for a duration of nearly 15 months. Two other treatments were run (2,000 barrels and 800 barrels) without increase in oil production and reduction of water production. Those were effective, however, to keep the levels reached in the first treatments. Until July 1999, the whole set of treatments in one particular well resulted in an additional accumulated oil production of the order of 2,486 m³, and a reduction in the accumulated water production of 14,809 m³.

As represented in TABLE 5 below, 33 of the 43 treatments have shown an increase in the oil production and/or reduction in water production (76% success rate).

TABLE 5

| Treatment | Well | Field | Kind of Treatment | Recovered Oil M³ | Water Reduced m³ |
|---|---|---|---|---|---|
| 1 | 1 | D | Selepol 2 | 0 | 9007 |
| 2 | 2 | D | Selepol 2 | 686 | 3926 |
| 3 | 3 | D | Selepol 2 | 0 | 5824 |
| 4 | 4 | D | Selepol 2 | 0 | 0 |
| 5 | 5 | D | Selepol 2 | 1849 | 0 |
| 6 | 6 | H | Selepol 2 | 2490 | 0 |
| 7 | 7 | H | Selepol 2 | 918 | 0 |
| 8 | 8 | H | Selepol 2 | 1553 | 0 |
| 9 | 9 | G | Selepol 2 | 1550 | 0 |
| 10 | 10 | G | Selepol 2 | 21 | 7297 |
| 11 | 11 | B | Selepol 1 | 2288 | 97220 |
| 12 | 12 | F | Selepol 2 | 7034 | 0 |
| 13 | 13 | I | Selepol 2 | 1433 | 31511 |
| 14 | 14 | I | Selepol 2 | 3355 | 2347 |
| 15 | 15 | I | Selepol 2 | 383 | 25655 |
| 16 | 16 | E | Selepol 2 | 0 | 31837 |
| 17 | 17 | A | Selepol 1 | 4781 | 0 |
| 18 | 18 | F | Selepol 2 | 106 | 0 |
| 19 | 19 | F | Selepol 2 | 2602 | 0 |
| 20 | 20 | F | Selepol 2 | 0 | 13571 |
| 21 | 21 | F | Selepol 2 | 398 | 0 |
| 22 | 22 | F | Selepol 2 | 647 | 2211 |
| 23 | 23 | F | Selepol 2 | 478 | 8822 |
| 24 | 24 | F | Selepol 2 | 671 | 3768 |
| 25 | 25 | D | Selepol 2 | 0 | 17528 |
| 26 | 26 | D | Selepol 2 | 326 | 3328 |
| 27 | 27 | D | Selepol 2 | 116 | 4559 |
| 28 | 28 | D | Selepol 2 | 0 | 26168 |

TABLE 5-continued

| Treatment | Well | Field | Kind of Treatment | Recovered Oil M³ | Water Reduced m³ |
|---|---|---|---|---|---|
| 29 | 29 | D | Selepol 2 | 203 | 3614 |
| 30 | 30 | C | Selepol 2 | 778 | 0 |
| 31 | 31 | C | Selepol 2 | 0 | 771 |
| 32 | 32 | C | Selepol 2 | 77 | 0 |
| 33 | 33 | L | Selepol 2 | 0 | 22841 |
| 34 | 34 | L | Selepol 2 | 0 | 2917 |
| 35 | 35 | J | Control | 74.9 | 3182.4 |
| 36 | " | J | Control | 1127.5 | 4259.3 |
| 37 | " | J | Control | 53.9 | 183.6 |
| 38 | 35 | J | Selepol 2 | 1230 | 7184.3 |
| 39 | 36 | J | Control | 0 | 0 |
| 40 | 37 | J | Control | 162 | 169 |
| 41 | " | J | Selepol 1 | 0 | 0 |
| 42 | 38 | J | Control | 0 | 0 |
| 43 | 39 | J | Control | 681.6 | 2510.5 |
| 44 | 40 | J | Control | 0 | 0 |
| 45 | 41 | J | Control | 37.2 | 42.8 |
| 46 | 42 | J | Control | 4697.1 | 5789.2 |
| 47 | 43 | J | Control | 0 | 2074.9 |
| 48 | " | J | Control | 307.3 | 3395.8 |
| 49 | " | J | Control | 259.1 | 2138.7 |
| 50 | 44 | J | Control | 77.7 | 91.1 |
| 51 | " | J | Control | 3037.9 | 2765.5 |
| 52 | " | J | Selepol 2 | 94.9 | 96.5 |
| 53 | 45 | J | Control | 0 | 0 |
| 54 | 46 | J | Control | 0 | 0 |
| 55 | 47 | J | Selepol 2 | 0 | 0 |
| 56 | 48 | J | Control | 1576.3 | 1576.3 |
| 57 | " | J | Control | 1584.4 | 1584.4 |
| 58 | 49 | J | Control | 1703 | 10286.9 |
| 59 | 50 | J | Control | 4095.9 | 3868.3 |
| 60 | 51 | J | Control | 0 | 11326.1 |
| 61 | 52 | J | Control | 0 | 11660.5 |
| 62 | 53 | J | Selepol 1 | 0 | 0 |
| 63 | 54 | J | Control | 6.1 | 1493.8 |
| 64 | " | J | Control | 136.3 | 4435.9 |
| 65 | " | J | Selepol 1 | 1187 | 315.9 |
| 66 | " | J | Selepol 2 | 0 | 0 |
| 67 | 55 | J | Control | 1434.3 | 41368.3 |
| 68 | " | J | Selepol 1 | 0 | 0 |
| 69 | " | J | Control | 0 | 0 |
| 70 | " | J | Selepol 1 | 3065.5 | 11998.9 |
| 71 | 56 | J | Control | 518 | 518 |
| 72 | " | J | Control | 0 | 12200.1 |
| 73 | 57 | J | Control | 479.3 | 479.3 |
| 74 | 58 | J | Control | 3127.2 | 3127.2 |
| 75 | 59 | J | Control | 1796.3 | 15560.4 |
| 76 | " | J | Control | 0 | 0 |
| 77 | 60 | J | Control | 2399.9 | 2399.9 |
| 78 | 61 | J | Selepol 2 | 0 | 575 |
| 79 | 62 | J | Control | 0 | 0 |
| 80 | 63 | J | Selepol 1 | 0 | 0 |
| 81 | " | J | Control | 5033.6 | 5033.6 |
| 82 | 64 | J | Selepol 2 | 19.6 | 0 |
| 83 | 65 | J | Control | 0 | 0 |
| 84 | 66 | J | Selepol 2 | 0 | 0 |
| 85 | 67 | J | Selepol 2 | 0 | 0 |
| 86 | 68 | J | Selepol 2 | 0 | 0 |
| 87 | 69 | J | Control | 2467.3 | 2467.3 |
| 88 | 70 | J | Selepol 2 | 0 | 0 |
| 89 | " | J | Selepol 2 | 0 | 0 |
| 90 | 71 | J | Control | 1052.9 | 689.3 |
| 91 | 72 | J | Control | 2135.6 | 3632 |
| 92 | 73 | J | Control | 725.5 | 959.5 |
| 93 | 74 | J | Selepol 1 | 198.1 | 1240.9 |
| 94 | 75 | J | Control | 937.9 | 7526.3 |
| 95 | 76 | J | Control | 0 | 0 |
| 96 | 77 | J | Control | 0 | 0 |

Field Treatments—SELEPOL 1 and 2

The SELEPOL processes 1 and 2 were applied to 53 treatments in different oil fields in the North East area of Brazil.

The treatments comprised the sequential injection of solvent (aviation kerosene, C5+ and other solvents), polymer solutions, and finally a new solvent slug. The first solvent slug was designed to clean the well and remove the formation damage. It could be dispensed with in formations not having any occurrence of damage. In those cases, the injection of solvent was replaced by the injection of water. The second solvent slug aimed at restoring the relative permeability to oil in the formation, besides displacing the polymer slug to the interior of the formation.

Basically, the injection of the polymer solutions starts by the injection of the cationic polymer, so that anchoring for the following layers may be formed. In the treatment designed as SELEPOL 1, those layers comprise the sequential injection of anionic and cationic polymers, as much as required to attain the desired value of RRFw. On the contrary, in the SELEPOL 2 process, the remaining layers that follow the first one are made up of the sequential injection of anionic polymer and crosslinking agent (multivalent metal ions), also repeated as much as required to attain the desired value of RRFw. The last layers are always formed by cationic polymer or crosslinking agent, respectively in the SELEPOL 1 or 2 processes, so as to make layers that are more resistant to the divalent cationic ions present in the formation waters.

TABLE 6

| Field | $K_g$ | T | Salt | Selepol |
|---|---|---|---|---|
| A | 150 | 68 | 195,000 | Selepol 1 |
| B | 3,000 | 48 | 140,000 | Selepol 1 |
| C | 470 | 68 | 130,000 | Selepol 2 |
| D | 500 | 47 | 28,000 | Selepol 2 |
| E | 273 | 68 | 130,000 | Selepol 2 |
| F | 400 | 38 | 33,000 | Selepol 2 |
| G | 153 | 65 | 191,000 | Selepol 2 |
| H | 700 | 70 | 139,000 | Selepol 2 |
| I | 150 | 48 | 60,000 | Selepol 2 |
| J | 1,300 | 50 | 1,000 | Control, Selepol 1 & 2 |
| L | 300 | 60 | 70,00 | Selepol 2 |

The 53 treatments carried out on the SELEPOL 1 and 2 processes provided an increase in oil production of 40,538 m3 and reduction in water production of 346,133 m3, with a success rate of 77%. However, such rate may attain 100%, when the technique is well adapted to the conditions of permeability, salinity and temperature of the field under study. A good example has been the campaign effected in field F, as may be seen in TABLE 7 below.

TABLE 7

| Well | Flow Rate of Oil (m/d) | | BSW (%) | | Total flow Rate (m/d) | |
|---|---|---|---|---|---|---|
| | Before | After | Before | After | Before | After |
| 12 | 2.5 | 23.3 | 92 | 82 | 31 | 130 |
| 18 | 0 | 2.7 | 100 | 90 | 36 | 42 |
| 19 | 0 | 9.1 | 100 | 90 | 138 | 82 |
| 20 | 3.6 | 9.2 | 98 | 91 | 120 | 102 |
| 21 | 0.6 | 1.5 | 95 | 89 | 12 | 13 |
| 22 | 1.7 | 2.7 | 95 | 92 | 34 | 33 |
| 23 | 2.8 | 3.3 | 96 | 90 | 69 | 33 |
| 24 | 1.3 | 6.5 | 96 | 83 | 31.4 | 38 |
| Total | 12.5 | 58.3 | | | 714 | 463 |
| Media por poço | 1.6 | 7.3 | | | 58.9 | 57.9 |

Data from lab as well as field results indicate the technical viability of the solutions of the invention and of the SELEPOL 1 and 2 processes, as well as of the Control, the success rate attaining between 70 and 100%. Besides the substantial increase in the oil production of the treated fields, in the average the gain is around 5 times the cost, for an average interval longer than 2 years.

The present process is also suitable for reducing water in a cone as well channeling from water injection.

We claim:

1. A process for the selective and controlled reduction of the permeability to water in oil-bearing formations of average to high permeability and temperature between 45° C. and 110° C. traversed by a well for the production of oil and/or gas, wherein said process comprises, for said production well:

(a) injecting a slug of cationic polymer aqueous solution in an amount required for adsorption in a certain radius of penetration in the formation, a portion of said aqueous solution creating a polymer layer adsorbed to the formation and containing free positive residual charges, while another portion remains non adsorbed and may be displaced by successive slugs of brine and polymer up to the required radius of penetration;

(b) injecting a spacing slug of an aqueous brine solution, so as to displace said non-adsorbed portion of the slug of cationic polymer aqueous solution towards the interior of the formation, whereby will be separated the slug of cationic polymer solution already injected and the slug of anionic polymer aqueous solution to be injected;

(c) injecting a slug of anionic polymer aqueous solution in an amount sufficient to create a layer of anionic polymer adsorbed to the said layer of cationic polymer previously adsorbed to the formation rock;

(d) injecting a spacing slug of an aqueous brine solution for spacing the polymer slugs and displacing the slug of anionic polymer aqueous solution towards the interior of the formation;

(e) repeating the alternating injection of slug of cationic and anionic polymer aqueous solution, the slugs being spaced by the injection of a slug of brine, and provided that the last layer is always a cationic polymer, until the injection pressure of polymer aqueous solution attains the desired value of Residual Resistance Factor to water (RRFw);

(f) closing the well for the required time so that the aqueous solution of polymer slug is adsorbed to the formation rock; and (g) resuming well production.

2. A process according to claim 1, wherein the oil-bearing formation is a sandstone formation.

3. A process for the selective and controlled reduction of the permeability to water in oil-bearing formations of average to high permeability and temperature between 45° C. and 110° C. traversed by a well for the production of oil and/or gas, wherein said process comprises, for said production well:

(a) injecting a slug of an anionic polymer aqueous solution in the required amount for adsorption in a certain penetration radius in the formation, a portion of said aqueous solution creating a polymer layer adsorbed to the formation and containing residual free negative charges, while another portion remains non-adsorbed to be displaced by successive layers of brine and polymer until the required penetration radius;

(b) injecting a spacing slug of aqueous brine solution to displace said non-adsorbed portion of the anionic polymer aqueous solution towards the interior of the formation, whereby will be spaced said slug of anionic polymer previously injected and the slug of cationic polymer solution to be injected;

(c) injecting a slug of aqueous solution of cationic polymer, in an amount sufficient to form a layer of cationic polymer adsorbed to the said layer of anionic polymer previously adsorbed to the formation rock;

(d) injecting a spacing slug of aqueous brine solution for spacing between polymer slugs and displacement of the cationic polymer solution towards the interior of the formation;

(e) repeating the alternating injection of slug of anionic and cationic polymer aqueous solution, the slugs being spaced by the injection of brine slug, and provided that the last layer is always made of a cationic polymer, until the injection pressure of the aqueous solution attains a value such that it meets the desired value of the Residual Resistance Factor to water (RRFw);

(f) closing the well during the time required for the slug of polymer aqueous solution to be adsorbed to the formation rock; and (g) resuming well production.

4. A process according to claim 3, wherein the formation is a limestone formation.

5. A process according to claim 1 or 3, wherein further, after injecting the first slug of aqueous solution of anionic polymer and spacing slug, a slug of an aqueous solution of multivalent crosslinking agent bearing at least three positive charges is injected, a portion of said slug of aqueous solution of crosslinking agent providing a punctual, intermolecular and intramolecular crosslinking with the anionic polymer and still containing free residual positive charges, another portion of the slug of crosslinking agent remaining in a non-crosslinked state to be displaced by the brine slug towards the interior of the formation, the addition of the crosslinking agent being repeating until the desired Residual Resistance Factor (RRFw) value is attained.

6. A process according to claim 5, wherein the crosslinking agent is a multivalent metal cation such as $Fe^{3+}$, $Al^{3+}$, $Ti^{4+}$, $Sn^{4+}$, $Zr^{4+}$ and $Cr^{3+}$, able to form tridimensional links with the charges of the anionic polymer.

7. A process according to claim 5 or 6, wherein the multivalent crosslinking agent is employed in amounts between 20 and 500 ppm based on the total volume of aqueous solution of crosslinking agent.

8. A process according to claim 7, wherein the multivalent crosslinking agent is an aluminum halide.

9. A process according to claim 8, wherein the aluminum halide is the poly (aluminum chloride) (PAC) of formula

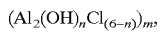

where m<10 and 1<n<5.

10. A process according to claim 5, wherein the slugs of cationic and anionic polymer aqueous solutions, slug of crosslinking agent and aqueous spacing brine slug contain further an alkali metal chloride in an amount of 100 to 30,000 ppm by weight of alkali metal chloride, based on the total volume of the aqueous solution.

11. A process according to claim 10, wherein the alkali metal chloride of the aqueous solutions is potassium chloride.

12. A process according to claim 10, wherein the alkali metal chloride of the aqueous solutions is sodium chloride.

13. A process according to claim 1, 3 or 10, wherein the layers of adsorbed polymer are free of tridimensional gel.

14. A process according to claim 1 or 3, wherein the spacing brine slug solely provides a reaction between the cationic and/or anionic polymers effectively adsorbed to the formation rock.

15. A process according to claim 1 or 3, wherein the cationic polymer comprises copolymers of acrylic acid and acrylamide and their esters, quaternized or not with dimethyl sulfate or chloromethylation, copolymers of methacrylic acid and acrylamide and their esters, quaternized or not by dimethyl sulfate or chloromethylation, polyacrylamide, partially hydrolyzed polyacrylamides and polyamines.

16. A process according to claim 1 or 3, wherein the anionic polymer comprises acrylamide copolymerized with acrylic acid, 2-acrylamido-2-methyl propanosulfonic acid and their copolymers and terpolymers in any amount.

17. A process according to claim 1, 3 or 11, wherein the aqueous solutions contain between 500 and 4,000 ppm of cationic polymer.

18. A process according to claim 1, 3 or 16 wherein the aqueous solutions contain between 500 and 3,000 ppm of anionic polymer.

19. A process according to claim 1, 3 or 15, wherein the cationic polymer comprises at least one of the structures:

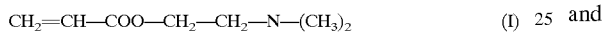 (I)

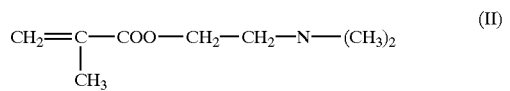 (II)

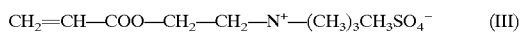 (III)

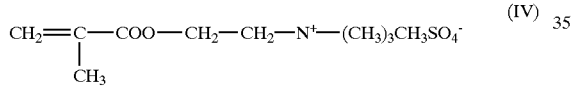 (IV)

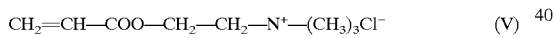 (V)

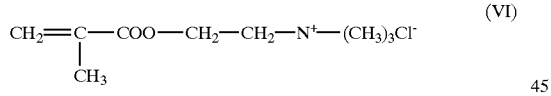 (VI)

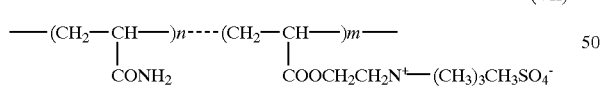 (VII)

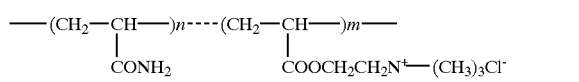 (VIII)

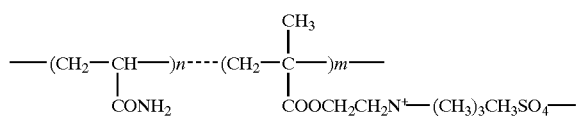 (IX)

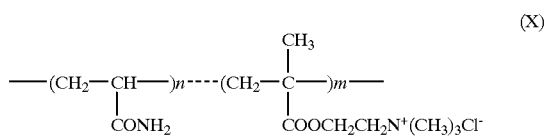 (X)

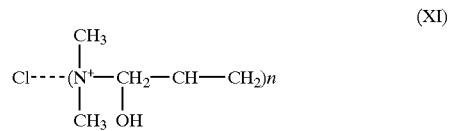 (XI)

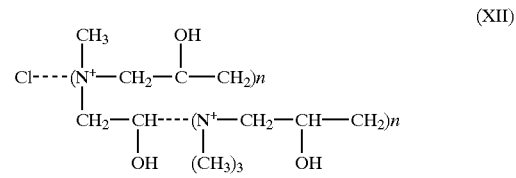 (XII)

and

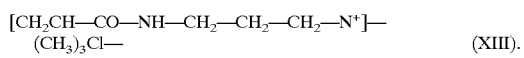 (XIII).

20. A process according to claim 19, wherein the preferred cationic polymers comprise the structures (XII) and (XIII).

21. A process according to claim 1, 3 or 18, wherein the anionic polymers comprise copolymers and terpolymers that contain, in any amount, structures (XIV), (XV) and (XVI):

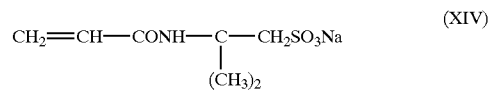 (XIV)

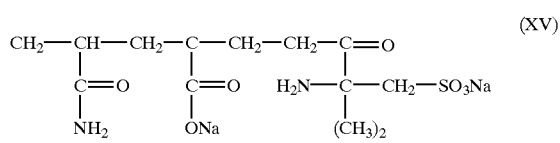 (XV)

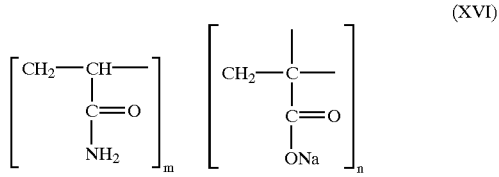 (XVI)

Where n+m=100, m is between 1 and 99, where n is between 1 and 100.

22. A process according to claim 1, 3, 15 or 16, wherein the molecular weight of the polymers comprises molecular weights between 50,000 and $20 \times 10^6$, the molecular weight of the polymers of lower molecular weight being between 50,000 and $3 \times 10^6$, while the molecular weight of the polymers of higher molecular weight is higher than $3 \times 10^6$ until $20 \times 10^6$.

* * * * *